…

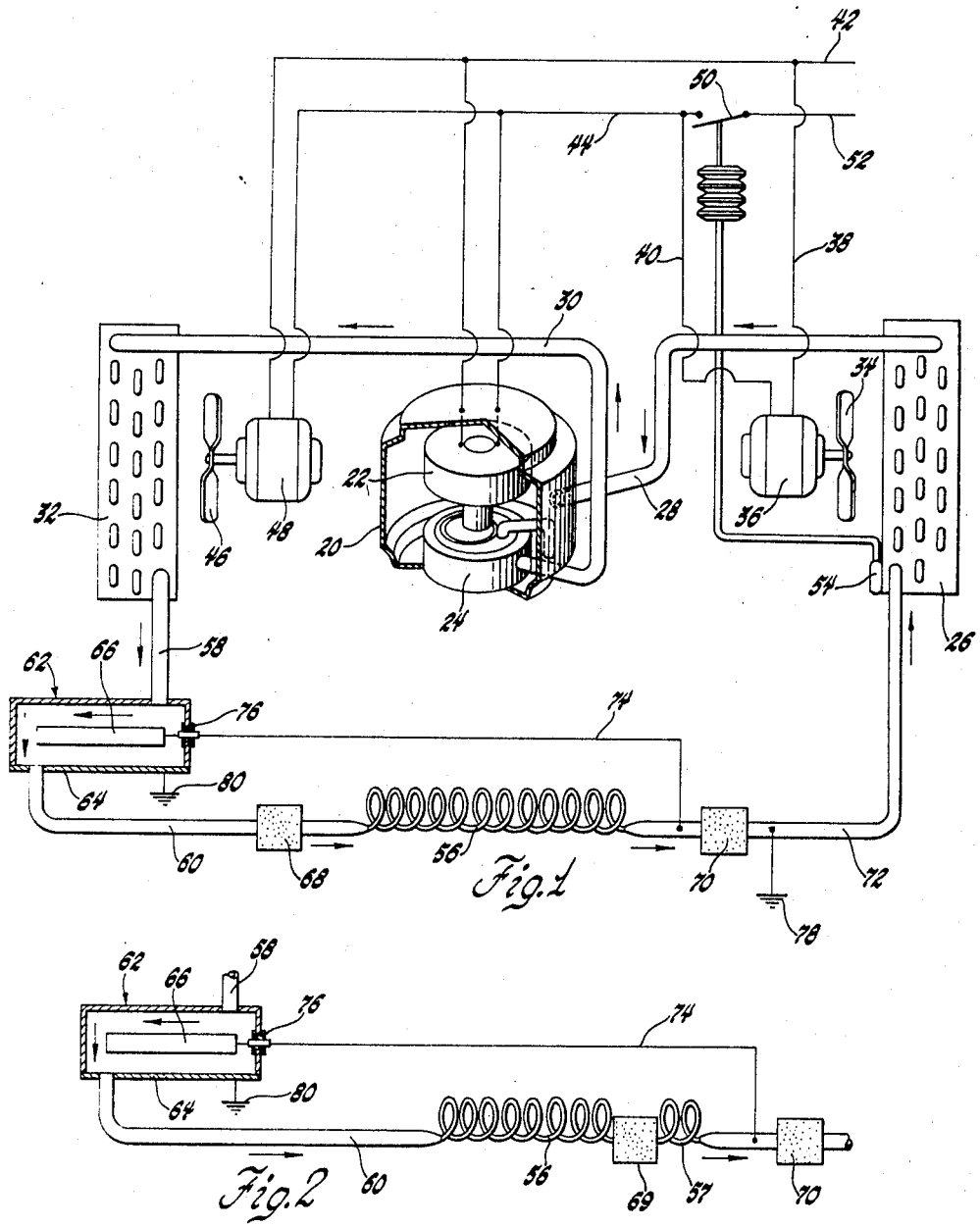

United States Patent Office 3,475,917
Patented Nov. 4, 1969

3,475,917
ELECTROSTATIC CLEANER APPLICATION
Richard C. Schwing, Troy, Mich., assignor to General Motors Corporation, Detroit, Mich., a corporation of Delaware
Filed June 17, 1968, Ser. No. 737,734
Int. Cl. F25b *43/00*
U.S. Cl. 62—85                            4 Claims

ABSTRACT OF THE DISCLOSURE

In the preferred form, the refrigerant circuit is provided with an electrostatic precipitator located at the entrance of a capillary restrictor to cause the electrostatic precipitation of particles from the refrigerant prior to its entrance into the restrictor. Preferably the capillary restrictor tube is electrically isolated in the circuit and the streaming potential generated therein by the flow of refrigerant therethrough is used to power the electrostatic precipitator.

---

It has been recognized that there is a tendency for particles to deposit at the outlets of various types of flow restricting devices in refrigerating systems. This is particularly serious when small bores restrictor tubes are used in refrigerating systems operating under high temperature conditions. I have discovered that this phenomenon of capillary deposition resulting from the electrochemical properties of the refrigerant of the refrigerating system produces a streaming potential of the order of 10,000 to 100,000 volts. This phenomenon thereby creates a virtual electrostatic precipitator in the final portions of the capillary restrictor tube causing the interior of the tube to become increasingly rough so that the flow is gradually reduced during the life of the refrigerating system to gradually reduce its capability of producing cold.

It is an object of my invention to cause the electrostatic precipitation of the particles in the refrigerant circuit at a location where the flow of refrigerant will not be substantially affected and to cause this precipitation to take place in advance of the flow restricting device, thereby minimizing the deposits in the flow restricting device.

It is another object of my invention to employ the streaming potential generated in the capillary restrictor tube or segment thereof in the refrigerating system for powering an electrostatic precipitator located in the refrigerant circuit in advance of the capillary restrictor tube.

Further objects and advantages of the present invention will be apparent from the following description, reference being had to the accompanying drawings, wherein preferred embodiments of the present invention are clearly shown.

In the drawings:

FIGURE 1 is a diagrammatic illustration of a refrigerating system embodying one form of my invention;

FIGURE 2 is a diagrammatic illustration of a capillary restrictor embodying a second form of my invention.

Referring now to the drawings, there is shown a sealed motor compressor unit 20 containing a motor 22 and a compressor 24. The compressor withdraws evaporated refrigerant from the evaporator 26 through the suction conduit 28 and discharges the compressed refrigerant through the discharge conduit 30 to the condenser 32. The evaporator 26 cools air which is circulated through it by a propeller type fan 34 driven by an electric motor 36 which is connected by the conductors 38 and 40 to the supply conductor 42 and the conductor 44. The motor 22 is likewise connected to the conductors 42 and 44.

The condenser 32 is cooled by a propeller type fan 46 driven by an electric motor 48, connected to the conductors 42 and 44. The operation of all three motors is controlled by thermostatic switch 50 which connects and disconnects the conductor 44 from the supply conductor 52 in accordance with the temperature of the thermostat bulb 54 mounted upon the lower portion of the evaporator 26. The system thus far described is merely one example of a typical air conditioning system and the specific details are merely to illustrate one specific application of the invention. A capillary restrictor tube 56 is employed as a flow restricting device to control the flow of refrigerant so as to maintain a higher pressure in the condenser 32 and create a lower pressure in the evaporator 26 during the operation of the motor compressor unit 22, 24.

According to my invention, connected between the outlet conduit 58 extending from the bottom of the condenser 32 and the conduit 60 connecting with the inlet of the entire capillary restrictor tube 56 is an electrostatic precipitator 62 having a grounded metal housing 64 and an insulated metal electrode 66 located centrally within the interior of the housing 64. This electrostatic precipitator 62 is illustrated diagrammatically and may take any suitable form suitable for causing the electrostatic precipitation resulting from the electrochemical properties of the refrigerant. The precipitator 62 has sufficiently large passages therein for refrigerant flow so that the precipitation deposits therein will not materially affect or reduce the refrigerant flow through the system. The electrochemical properties which are related to the electrostatic precipitation of various refrigerants appear to vary in accordance with their electrical conductivity. Refrigerants having a conductivity between $10^{-10}$ ohm$^{-1}$ cm.$^{-1}$ and $2.0\times10^{-14}$ ohm$^{-1}$ cm.$^{-1}$ are prone to capillary deposit production. The precipitation is most severe for refrigerants having a conductivity between $10^{-12}$ and $10^{-11}$ ohm$^{-1}$ cm.$^{-1}$. Specific examples of refrigerants commonly used in air conditioning systems having the most severe problems of electrostatic precipitation are those known as R22 and R502. R22 is monochlorodifluoromethane ($CHClF_2$) and R502 is an azeotropic mixture of R22 and chloropentafluoroethane ($CHClF_2/CClF_2CF_3$).

This electrostatic precipitator 62 may be powered from any suitable high voltage source to cause the electrostatic precipitation to take place in the refrigerant before it flows through the restrictor 56. However, I have discovered it is preferable and more simple and convenient to provide suitable electrical insulators 68 and 70 in the connections adjacent the entrance and exit of the capillary restrictor tube 56. These electrical insulators may be of any suitable type but preferably they are either of porcelain or some suitable plastic or resin such as synthetic rubber. The insulator 68 provides the connection between the entrance of the capillary restrictor tube 56 and the conduit 60 while the insulator 70 provides a connection between the outlet of the capillary restrictor tube 56 and the conduit 72 connecting with the inlet to the evaporator 26. The flow of refrigerant R22 through the capillary tube 56 generates a streaming potential of the order of 10,000 to 100,000 volts which tends to make this an electrostatic precipitator.

According to a second feature of my invention, I provide an electrical conduit 74 connecting the electrically isolated capillary restrictor tube 56 with the electrode 66 within the housing 64 through an insulating bushing 76 in the housing 64. With this arrangement the streaming potential is employed to power the electrostatic precipitator 62. The refrigerating system is grounded by a ground 78 upon the conductor 72 and also by a ground 80 connected to the housing 64.

When the refrigerant flows through the capillary restrictor tube 56 generating a streaming potential of the order of 10,000 to 100,000 volts during the operation of the sealed unit 20, this voltage is applied through the conductor 74 to the electrode 66 to cause electrostatic precipitation to take place out of the refrigerant flowing within the housing 64. The housing 64 is sufficiently spacious such that an accumulation of the electrostatic deposits will not cause a restriction to flow of the refrigerant. The housing 64, in addition to serving as an electrostatic precipitator, can also serve the function of a receiver. Inasmuch as the electrostatic precipitator 62 operates to precipitate particles from the refrigerant before it flows into the capillary restrictor tube 56, the particles are sufficiently removed from the refrigerant so that there is substantially less deposit therein and substantially less decrease in the flow of refrigerant through the system throughout its useful life.

Referring now to FIGURE 2 for a second form of the invention, the restrictor 56 is provided with an insulator 69 electrically separating the initial portion of the restrictor 56 from the isolated final portion 57. I have found that under some circumstances various segments in the restrictor will generate the same or at times a higher potential than the entire restrictor, since it appears that some secions of the restrictor may generate potentials of a different polarity than other sections. The arrangement shown in FIGURE 2 takes advantage of this discovery by electrically isolating only one segment, such as the final segment 57, of the restrictor which is located between the insulators 69 and 70. The large streaming potential generated in this final segment 57 is conducted by the conductor 74 to the electrode 66 in the interior of the housing 64 of the electrostatic precipitator 62 which is located in front of the entrance to the restrictor 56 as in FIGURE 1.

The operation of the refrigerating system is similar to that described in association with FIGURE 1 and the voltage resulting from the streaming potential is applied in the same manner to the electrostatic precipitator 62 to cause the electrostatic precipitation to take place within the housing 64 in a similar manner. While the final segment usually generates the greatest potential, the streaming potential originating in other segments may be used if desired.

While the embodiments of the invention as herein disclosed constitute preferred forms, it is to be understood that other forms might be adopted.

I claim:
1. The method of reducing deposits adjacent a pressure reducing device in a refrigerating system containing particles in the circulating refrigerant, wherein the improvement comprises charging the particles in said refrigerant with an electrostatic charge adjacent the entrance to said pressure reducing device, and exposing the charged particles in said refrigerant to a surface maintained at a substantially different potential than said charged particles in said refrigerant to attract the charged particles to said surface for preventing deposits of said particles in said pressure reducing device.

2. The method of reducing deposits in a refrigerating system wherein an electrostatic charge is generated in the pressure reducing device by the flow of refrigerant therethrough wherein the improvement comprises conducting the charge generated in the pressure reducing device to a first surface exposed to the flow of refrigerant adjacent the entrance to said pressure reducing device for charging any particles contained in the circulating refrigerant, and exposing the charged particles in the refrigerant to a second surface adjacent said entrance maintained at a substantially different potential than said first surface and said charged particles to attract said charged particles to said second surface for preventing deposits of said particles in said pressure reducing device.

3. A refrigerating system including a refrigerant circuit containing a refrigerant and a compressor and a condenser and a flow restricting device and an evaporator wherein the improvement comprises an electrostatic precipitator in said circuit between said condenser and said flow restricting device, said precipitator having an insulated electrode contacted by the refrigerant flowing from said condenser to said flow restricting device, said circuit being provided with electrical insulating means between one portion of said flow restricting device and said evaporator and between a second portion of said flow restricting device and said electrostatic precipitator for electrically isolating at least a portion of said flow restricting device from the remainder of said circuit, said flow restricting device being electrostatically charged by refrigerant flow, and electrical conductor means electrically connecting said flow restricting device and said insulated electrode for charging said electrode.

4. A refrigerating system including a refrigerant circuit having enclosing walls containing a refrigerant and a compressor and a condenser and a flow restricting device and an evaporator wherein the improvement comprises an electrostatic precipitator in said circuit between said condenser and said flow restricting device for charging particles in the refrigerant prior to the entry of the refrigerant into the flow restricting device, said precipitator comprising electrostatic precipitating means and electrical insulating means for electrostatically isolating said electrostatic precipitating means from said enclosing walls.

References Cited

UNITED STATES PATENTS

| 2,341,429 | 2/1944 | Elsey | 62—77 |
| 2,428,667 | 10/1947 | Henriqez | 62—276 |
| 3,070,971 | 1/1963 | Jacobs | 62—78 |
| 3,205,679 | 9/1965 | Geist | 62—474 |

WILLIAM J. WYE, Primary Examiner

U.S. Cl. X.R.

62—77, 78, 195, 474